US010767619B2

(12) United States Patent
Kopp et al.

(10) Patent No.: US 10,767,619 B2
(45) Date of Patent: Sep. 8, 2020

(54) INTEGRATED SYSTEM FOR OPTIMAL EXTRACTION OF HEAD-DRIVEN TIDAL ENERGY WITH MINIMAL OR NO ADVERSE ENVIRONMENTAL EFFECTS

(71) Applicants: Brian Thomas Kopp, Jacksonville, FL (US); Donald Thomas Resio, Ponte Vedra, FL (US); Michelle Ann Vieira, Atlantic Beach, FL (US); Abdallah Walid Mohamed Kamal El Safty, Jacksonville, FL (US)

(72) Inventors: Brian Thomas Kopp, Jacksonville, FL (US); Donald Thomas Resio, Ponte Vedra, FL (US); Michelle Ann Vieira, Atlantic Beach, FL (US); Abdallah Walid Mohamed Kamal El Safty, Jacksonville, FL (US)

(73) Assignee: University of North Florida Board of Trustees, Jacksonville, FL (US)

( * ) Notice: Subject to any disclaimer, the term of this patent is extended or adjusted under 35 U.S.C. 154(b) by 0 days.

(21) Appl. No.: 16/787,939

(22) Filed: Feb. 11, 2020

(65) Prior Publication Data

US 2020/0200142 A1 Jun. 25, 2020

Related U.S. Application Data

(63) Continuation of application No. PCT/US2018/000147, filed on Aug. 15, 2018.
(Continued)

(51) Int. Cl.
*F03B 13/26* (2006.01)
*H02K 7/18* (2006.01)

(52) U.S. Cl.
CPC ........... *F03B 13/26* (2013.01); *H02K 7/1823* (2013.01)

(58) Field of Classification Search
CPC .............................. F03B 13/26; H02K 7/1823
(Continued)

(56) References Cited

U.S. PATENT DOCUMENTS 3,803,422 A * 4/1974 Krickler .................. F03B 13/00
290/52
4,182,123 A * 1/1980 Ueda ..................... F03B 13/086
137/123
(Continued)

FOREIGN PATENT DOCUMENTS

GB 2454913 A 5/2009
WO 2019035883 A1 2/2019

OTHER PUBLICATIONS

International Search Report and Written Opinion issued by the International Searching Authority dated Jan. 4, 2019 for corresponding International Patent Application No. PCT/US18/00147.
(Continued)

*Primary Examiner* — Pedro J Cuevas
(74) *Attorney, Agent, or Firm* — Smith & Hopen, P.A.; Paul Murty

(57) ABSTRACT

A closed system that captures energy derived from the head differential rather than open-water flows velocities while reducing potential environmental damages and costly maintenance due to bio-fouling. This energy density available in a tidal range is increased substantially via convergent "nozzles" to produce an optimal speed for power generations with the turbine sections, thereby significantly increasing the tidal energy captured by this system, even at sites where tidal energy is low (e.g., small to medium tide ranges, such as found along the East and Gulf Coasts of the United States).

20 Claims, 6 Drawing Sheets

Related U.S. Application Data

(60) Provisional application No. 62/545,720, filed on Aug. 15, 2017.

(58) Field of Classification Search
USPC .............................. 290/1 R, 53; 60/325, 398
See application file for complete search history.

(56) References Cited

U.S. PATENT DOCUMENTS

| | | | | |
|---|---|---|---|---|
| 4,288,985 A * | 9/1981 | Dyck | ..................... | F03B 13/086 137/132 |
| 4,364,228 A * | 12/1982 | Eller | ..................... | F03B 13/08 137/143 |
| 4,409,489 A * | 10/1983 | Hayes | ..................... | F03G 7/08 290/1 R |
| 4,739,179 A * | 4/1988 | Stites | ..................... | F04B 17/00 290/1 R |
| 5,157,922 A * | 10/1992 | Baruch | ..................... | F04B 35/00 60/325 |
| 5,355,674 A * | 10/1994 | Rosenberg | ..................... | F04B 35/00 290/1 R |
| 6,091,159 A * | 7/2000 | Galich | ..................... | F03G 7/08 290/1 R |
| 6,114,773 A * | 9/2000 | Kouris | ..................... | F03B 13/105 290/52 |
| 6,172,426 B1 * | 1/2001 | Galich | ..................... | F03G 7/08 290/1 R |
| 6,376,925 B1 * | 4/2002 | Galich | ..................... | F03G 7/08 290/1 R |
| 6,822,343 B2 * | 11/2004 | Estevez | ..................... | H02K 7/1853 290/1 R |
| 6,863,028 B2 * | 3/2005 | Sherman | ..................... | E02B 9/08 119/211 |
| 7,629,698 B2 * | 12/2009 | Horianopoulos | ..................... | F03G 7/08 290/1 R |
| 8,680,697 B2 * | 3/2014 | Alqanee | ..................... | C12Q 1/18 290/1 C |
| 9,243,608 B1 * | 1/2016 | Smith | ..................... | E02B 9/08 |
| 9,644,600 B2 * | 5/2017 | Aldosari | ..................... | F03B 17/025 |
| 10,514,020 B1 * | 12/2019 | Resio | ..................... | F03B 13/264 |
| 2003/0168861 A1 * | 9/2003 | Estevez | ..................... | H02K 7/1853 290/1 R |
| 2006/0202483 A1 * | 9/2006 | Gonzalez | ..................... | F03B 13/1845 290/53 |
| 2010/0276935 A1 | 11/2010 | Dehlsen et al. | | |
| 2011/0081259 A1 | 4/2011 | Vowles | | |
| 2015/0211480 A1 | 7/2015 | Pingitore et al. | | |
| 2017/0089318 A1 * | 3/2017 | Aldosari | ..................... | F03B 17/04 |
| 2019/0085814 A1 * | 3/2019 | Bee | ..................... | F03D 9/17 |

OTHER PUBLICATIONS

International Preliminary Report on Patentability issued by the International Bureau dated Feb. 27, 2020 for corresponding International Patent Application No. PCT/US18/00147.

International Search Report and Written Opinion for PCT/US2019/035560 (filed: Jun. 5, 2019) dated Aug. 8, 2019; Applicant: University of North Florida Board of Trustees.

* cited by examiner

INTEGRATED SYSTEM FOR OPTIMAL EXTRACTION OF HEAD-DRIVEN TIDAL ENERGY WITH MINIMAL OR NO ADVERSE ENVIRONMENTAL EFFECTS

CROSS-REFERENCE TO RELATED APPLICATIONS

This application is a continuation of and claims priority to International Patent Application No. PCT/US2018/000147, entitled "INTEGRATED SYSTEM FOR OPTIMAL EXTRACTION OF HEAD-DRIVEN TIDAL ENERGY WITH MINIMAL OR NO ADVERSE ENVIRONMENTAL EFFECTS", filed Aug. 15, 2018, which claims priority to provisional application No. 62/545,720, entitled "Integrated System for Optimal Extraction of Head-Driven Tidal Energy with Minimal or No Adverse Environmental Effects," filed on Aug. 15, 2017, by the same inventors.

BACKGROUND OF THE INVENTION

Field of the Invention

This invention relates, generally, to tidal energy. More specifically, it relates to closed tidal energy systems capable of capturing tidal energy from areas of low flow velocity.

Brief Description of the Prior Art

Capturing hydropower from tides due to the rise and fall of sea levels is known in the art. Hydropower converts power obtained from tides into power, resulting in tidal energy. Existing systems for generating tidal energy are based on one of two concepts: (1) capturing fixed sections of currents flowing through a rotor (coupled with a turbine), optimally oriented orthogonal to the flow; and (2) using water-level gradient to drive a flow through a pipe/conduit which contains a turbine. Because of this, conventional tidal systems tend to be located/considered only in sites where flow velocities are high, which are typically coincident with regions of high tidal range or in areas of natural flow convergence, such as inlets. However, siting in these areas typically creates significant problems with potential system damage due to debris, biofouling, corrosion, and environmental impacts, and often are in competition with navigation for space in inlets.

Additionally, both flow-driven systems and head-driven systems, which use available seawater as their flow medium, are subject to damage by debris impacts, biofouling, and corrosion, and can have a very negative impact on fish and other aspects of the local ecology. Alternative systems have been proposed utilizing closed bladders in the offshore tidal area; however, it is obvious that the open onshore system, even if initially pristine, would eventually contain biological materials that would lead to biofouling within the system.

Other renewable energy capture devices, such as wind turbines, photovoltaic cells, hydropower systems, solar concentration plants, and other traditional tidal range plants are known. Currently, wind energy and their corresponding turbines offer a technology that is effective in high sustained-wind regions but cannot be implemented in coastal areas. Further, wind turbines under 100-kilowatt cost between $3000 to $8000 per kilowatt of capacity. At the utility scale, this initial construction cost is between $1.3-$2.2 million per MW of nameplate capacity. It is important to note that nameplate capacity of wind turbines and other energy producing plants is then scaled back by a capacity factor. Wind has an average capacity factor of 25% to 33%, meaning that wind farms will only achieve their nameplate capacity rating ¼ to ⅓ of their run time. This is due to inconsistent wind speeds, variability in wind directions, and time periods when no wind in present.

Tidal plants, in contrast, rely on a much more constant ebb and flow of the tides. These plants can be much more reliable than other energies such as wind and solar. The potential for energy harness from tidal energy is promising considering the total global potential for ocean tidal power has been estimated at 64,000 MW. However, as discussed, current hydropower systems rely on the existence of high tidal ranges and available connection conduits into existing inland water bodies, which are not prevalent in coastal regions along the Gulf Coast and East Coast (south of New England) of the United States. For example, there is potential for harvesting energy from the flow in the St. Johns River and other major rivers along these coastal areas, but the energy density is so small that it is economically impractical to do this on a commercial scale.

Accordingly, what is needed is a system that optimally extracts head-driven tidal energy with minimal or no adverse environmental effects. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a system that optimally extracts head-driven tidal energy with reduced negative environmental effects, thereby allowing for the extraction of tidal energy in nontraditional areas, is now met by a new, useful, and nonobvious invention.

The novel closed for optimal extraction of head-driven tidal energy with minimal negative environmental effects includes an on-shore bladder, and off-shore bladder, and a turbine disposed therebetween. The on-shore bladder and the off-shore bladder are in communication with each other, and a liquid is at least partially disposed within one of the on-shore and off-shore bladders. The liquid is adapted to flow between the bladders depending on a pressure differential therebetween. In addition, the liquid is adapted to flow through the turbine, which is a high-efficiency hydropower turbine disposed within a turbine housing. The liquid flows through the system with a flow velocity, which is used to capture head-driven tidal energy. The system has minimal negative environmental effects because it is a closed system that does not utilize external liquid sources, such as sea water or rain water.

The on-shore bladder is located at a local mean sea level, and is surrounded by an environment of water. Each of the bladders may be oversized, thereby allowing the total volume of the liquid in the system to be contained within one of the bladders at a given time. In addition, each of the bladders can expand upward and contract downward in the surrounding environment based on the water level surrounding the off-shore bladder, because they are oversized and can contain various pressures, creating the pressure differential needed to maximize energy production. Similarly, the bladders may be made of the same or different compliant material that allows the liquid to flow through the system with minimal lost energy due to friction, again maximizing the energy production.

The turbine housing is disposed between the bladders, and may include a generator and a pressure-sensing shut-off valve in addition to the turbine. The shut-off valve is opened when a pressure differential of a water level above the off-shore bladder is sufficient to generate optimal power from the flow of the liquid through the generator. Opening the shut-off valve permits head-driven flow of the liquid to flow through the generator. The shut-off valve is closed when the pressure differential above the off-shore bladder reduces to a value that is insufficient for optimal power generation. In addition, the shut-off valve remains closed until the lowering water above the off-shore bladder attains a potential pressure differential capable of producing optimal negative flow for power generation in the offshore direction. The off-shore and on-shore bladders may include manifolds on each side of the generator, with the manifolds functioning to cause flow velocity to increase as the flow approaches the generator. A control system may be included, which may include the manifolds; the control system maintains the flow velocity in an optimal velocity range for the hydropower turbine, thus enabling maximum energy extraction.

An object of the invention is to provide for the extraction of tidal energy that does not rely on the slope of an ocean floor, thereby expanding the area in which tidal energy can be captured and used as a renewable energy source and expanding the total amount of tidal energy that can be captured.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means ±15% of the numerical. In an embodiment, the term "about" can include traditional rounding according to significant figures of the numerical value. In addition, the phrase "about 'x' to 'y'" includes "about 'x' to about 'y'".

In certain embodiments, the current invention allows for scalable energy generation from tides, even in areas with relatively small tidal ranges, while avoiding many of the traditional pitfalls of existing technologies, such as biofouling, harm to marine ecosystems, damages to turbines due to debris in the water and wear on moving parts due to sediment and other suspended materials in the water. This system has the flexibility to be used in residential and commercial energy production applications. Additionally, the need for system maintenance is greatly reduced by placing the turbines on land for easy accessibility, which also permits easier access to the energy grid.

Coastal regions along most of the East and Gulf Coasts of the United States, and many other areas around the world, are located where (1) topographic slopes are very low for substantial distances inland, (2) wind speeds are quite low, and (3) tidal energy is presently not considered economically feasible. Thus, coastal regions are typically only able to utilize solar (photo-voltaic) sources to generate "green energy." As discussed herein, the current invention has the potential to solve this long-felt but unresolved need and provide these coastal regions with much needed additional options for "green energy" power generation.

Figure 1A:
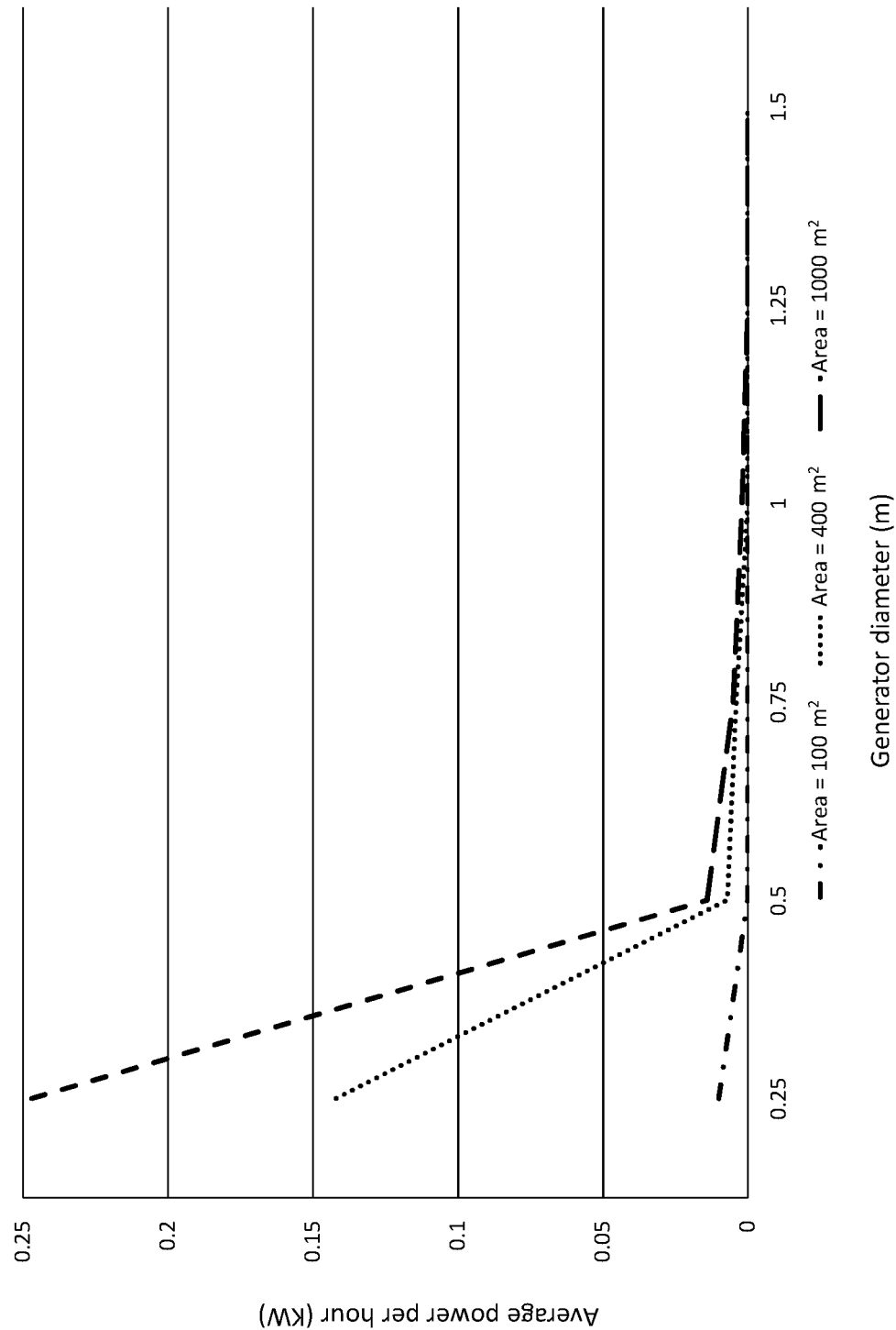
FIG. 1A is a graphical illustration depicting average power per hour versus generator diameter.

In an embodiment, the current invention is a closed system that utilizes closed bladders in an offshore tidal area, where closed bladders are used on both ends of the head-driven system. Using a closed system containing a specific volume of liquid within connected, symbiotic onshore-offshore, compliant bladders that include a hydropower turbine located between them, the system captures potential energy within the "head differentials" over a tidal cycle (see FIG. 1A). These compliant bladders can be scaled from small, residential-size systems up to commercial applications to accommodate local needs and meet a diverse set of applications. They can also be designed to conform to specific local environmental conditions and constraints.

The onshore bladder location lends itself to being placed in a shallow excavated, hydraulically-separated basin to allow for multiple land uses above it (e.g., parking garage, pier, port offloading area, etc.). In addition to the on-land, in-water setup, the system can use bladders that both reside under the surface of the water as long as sufficient "head differential" exists between the locations. Pressure-sensing valves can be included within such a cyclic system to optimize flow rates. Site selection will be an important aspect of the overall construction costs and minimizing adverse environmental impacts related to land loss. Examples of locations where bladder areas of over 500,000 $m^2$ can be located in the general Jacksonville vicinity.

The current tidal system can include bladder designs that are oversized such that each contains at least the total volume of fluid in the entire system. The onshore system can be located at local mean sea level, including the variation of local sea level on scales longer than typical tidal cycles. The extra material allows each bladder to expand upward and contract downward at appropriate rates, maximizing utilization of the pressure differential. The tidal system further includes connections between the onshore and offshore containers, which include either a high-efficiency hydro-turbine that is typical of turbines used at high-head dams in the U.S. or scaled-down versions of this class of turbine.

The system can further include a network of valves and convergence to increase the flow rate from the available head (typically less than about 1-2 feet at any given tide phase) to the flow rate of an equivalently much higher natural head. This flow rate is optimized to allow maximum power to be generated by any specific hydro-turbine system for a specific volume of water passing through the system. Increasing the available energy density enables the application of this system to include locations with low tidal ranges.

Figure 1B:
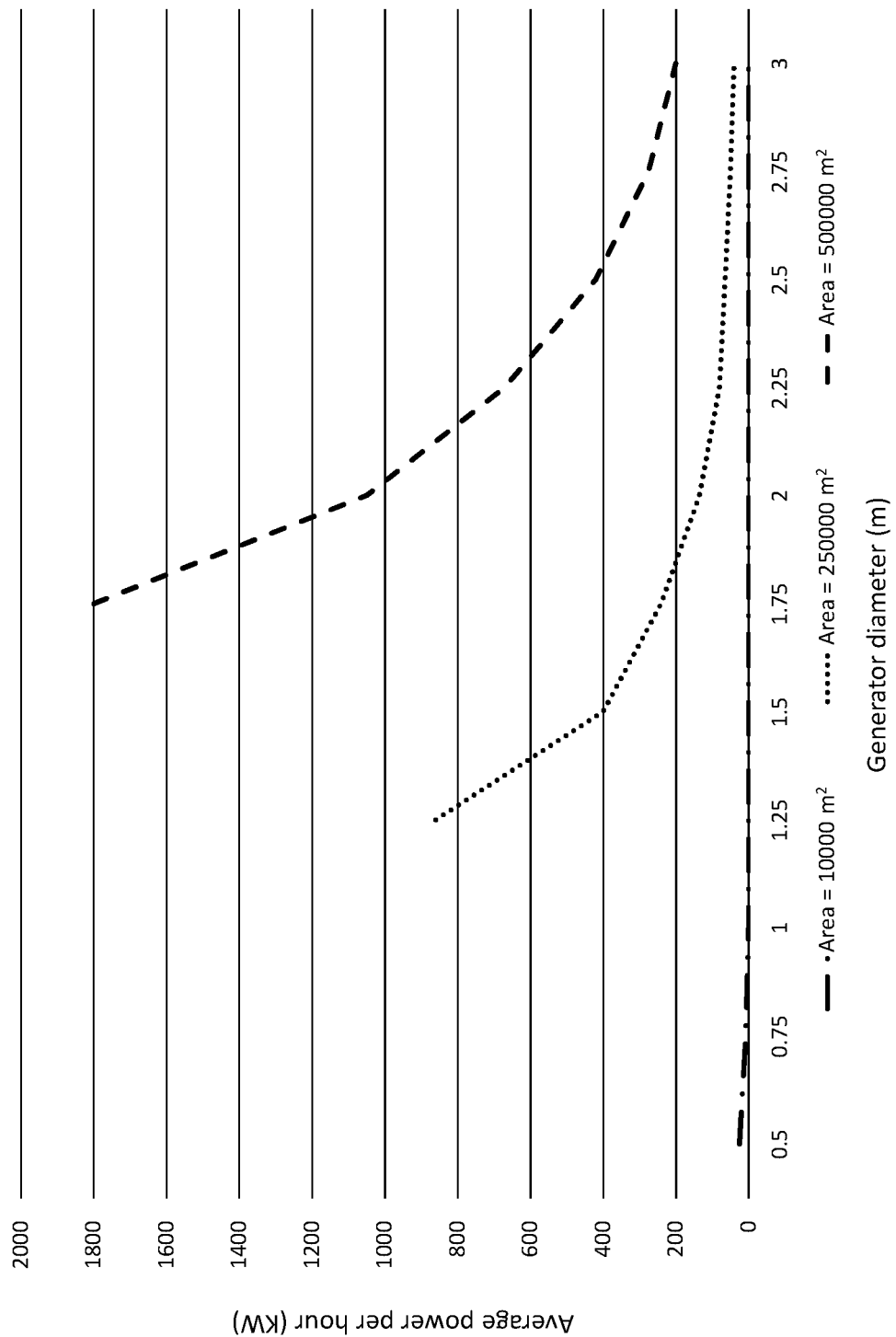
FIG. 1B is a graphical illustration depicting average power per hour versus generator diameter.

Overall, the control system can accelerate flows to optimal velocities, as will be particularly important for applications in areas with relatively small tidal ranges. The extra compliant material in each bladder allows water to flow in and out of the system with minimal lost energy from the head-differential (see FIG. 1B).

It is an object of the current invention to provide a closed volume tidal power generation system that minimizes many of the ecological concerns and system biofouling issues that arise when mechanisms are exposed to harsh salt water conditions, while at the same time extracting the maximum energy practical from a given volume of water. Because the mechanical hardware is kept in a controlled on-land accessible environment, the life of these parts can be prolonged much longer than those exposed to a natural environment. To avoid biofouling and maintenance problems, the system concept should use water from which all organisms and debris have been removed and which has been de-salinized to prevent the occurrence of significant corrosion. This provides both improved maintainability and environmental compatibility.

Figure 2A:
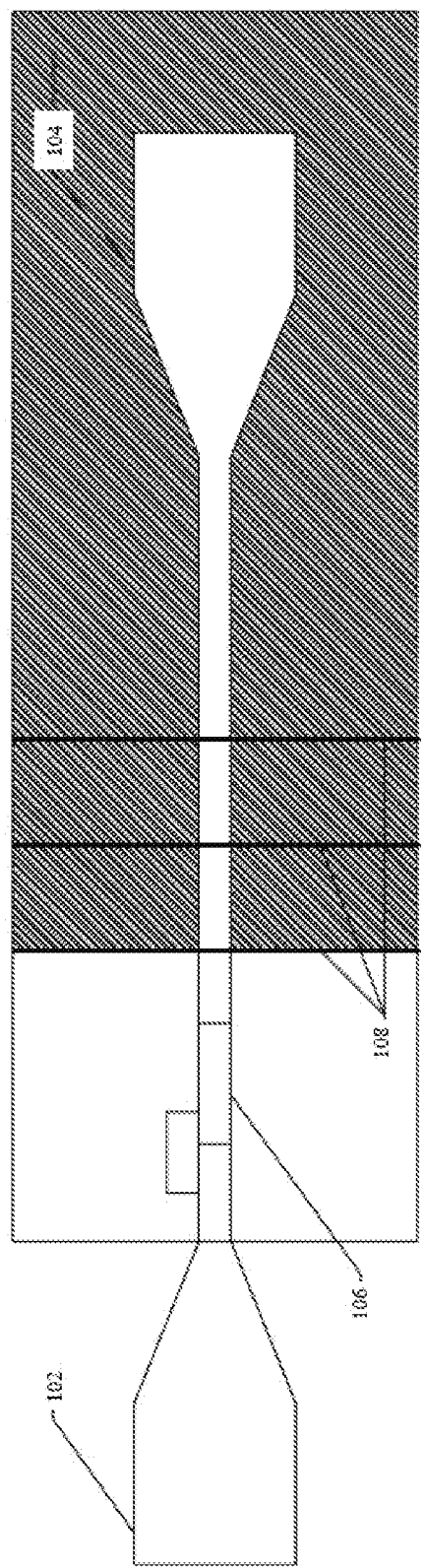
FIG. 2A is a top-plan view of a convergent bladder closed system tidal energy capture device, according to an embodiment of the current invention.
Figure 2B:
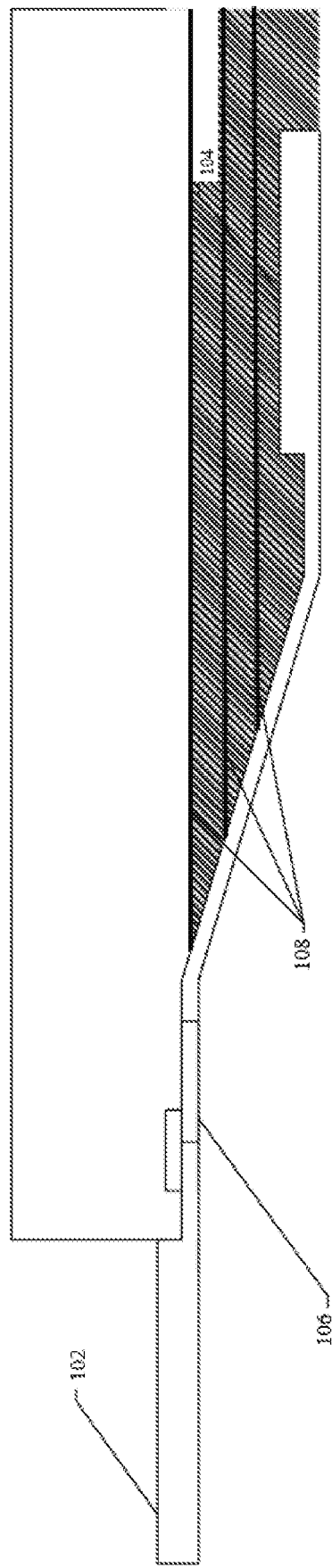
FIG. 2B is an orthogonal view of the convergent bladder closed system tidal energy capture device of FIG. 2A.
Figure 2C:
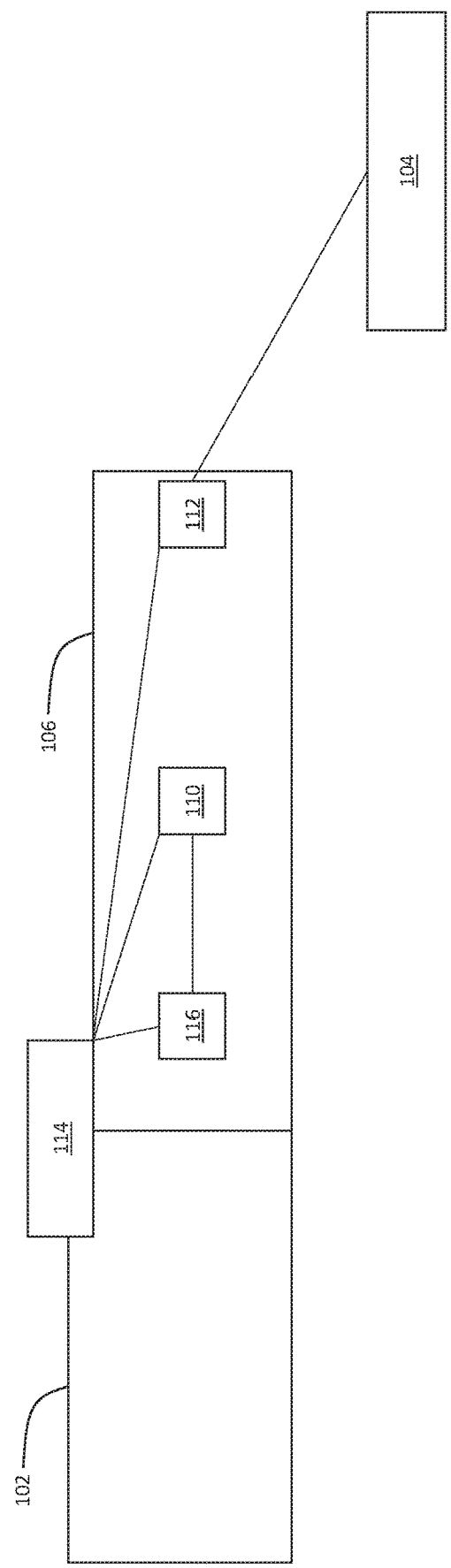
FIG. 2C is a close-up, internal view of the turbine housing of FIG. 2A.

Example 1 (see FIGS. 2A, 2B, and 2C)

An example of the mechanics of an embodiment of the current system is now discussed herein. The system includes an on-shore bladder 102 and an off-shore bladder 104, with a turbine housing 106 disposed between the bladders. Importantly, the entire system, including the bladders, the turbine housing, and the components disposed within the turbine housing, are part of a closed system. As such, the components are not in communication with the external environment; accordingly, the system is insulated, thereby reducing the potential environmental impacts of the system as compared with similar techniques of capturing tidal energy from bodies of water and along coastlines. Accordingly, instead of directly using water, such as sea water or rain water, to capture energy, the system indirectly uses external water to translate liquid contained within the closed system between the bladders. The translation of the liquid in the system will be discussed herein below.

Each of the on-shore bladder 102 and the off-shore bladder 104 is oversized and made from compliant material. The oversized nature of the bladders allows each bladder to contain the entire volume of the liquid housed within the system at any given time. The oversized nature of the bladders also allows each bladder to expand upward and contract downward within the surrounding environment, depending on a water level above the off-shore bladder. In addition, the compliant material of the bladders minimizes the loss of energy due to friction when the liquid moves between the bladders. The bladders are designed such that the system maximizes the pressure differential between the on-shore bladder and the off-shore bladder, particularly when the bladders and expanding upward and contracting downward based on the water level surrounding the off-shore bladder.

The turbine housing 106 is disposed between the on-shore bladder 102 and the off-shore bladder 104, such that the liquid in the system passes through the turbine housing 106 when moving between the on-shore bladder 102 and the off-shore bladder 104. While not explicitly shown in FIGS. 2A-2B, it is appreciated that various components can be housed within the turbine housing 106 to help capture tidal energy and turn the energy into a usable form. As shown in FIG. 2C in an embodiment, the turbine housing 106 includes a hydropower turbine 110 in communication with a generator 116, such that the turbine turns as a result of the pressure differential between the on-shore bladder 102 and the off-shore bladder 104.

In addition, the turbine housing 106 includes a pressure-sensing shut-off valve 112 that is in communication with the off-shore bladder 104. The shut-off valve is opened when a pressure differential of a water level above the off-shore bladder is sufficient to generate optimal power from the flow of the liquid through the generator. As such, the shut-off valve is designed to optimize the tidal energy captured by the system. Opening the shut-off valve permits head-driven flow of the liquid to flow through the generator, whereas shutting the shut-off valve prevents head-driven flow of the liquid through the generator. The shut-off valve closes when the pressure differential above the off-shore bladder reduces to a value that is insufficient for optimal power generation. In addition, the shut-off valve remains closed until the lowering water above the off-shore bladder attains a potential pressure differential capable of producing optimal negative flow for power generation in the offshore direction. As such, the valve optimizes energy capture not only as a result of positive flow, but also as a result of negative flow, thereby increasing the efficiency of the system and the capability of the system to capture energy for longer periods of time.

The turbine housing 106 can also include manifolds on each side of the generator to cause flow velocity to increase as the flow approaches the generator. These manifolds are designed to capture more tidal energy by easing the path of the liquid through the generator, thereby minimizing the amount of energy lost due to friction or as heat energy. In addition, a control system 114 can be implemented to maintain the flow velocity in an optimal velocity range for the hydropower turbine, thus enabling maximum energy extraction. The manifolds discussed above may be components of such a control system, which is again designed such that tidal energy capture is maximized.

The system may introduce convergence and nozzles to increase the flow velocity of the liquid within the system. Both convergence and nozzle components are designed to decrease the area through which liquid can pass through the system. As a result of the decrease in the possible area through which the liquid can travel when moving between the on-shore bladder 102 and the off-shore bladder 104, the system can control and increase the flow velocity of the liquid. By increasing the flow velocity, the system can increase the tidal energy captured as a result of the movement of the bladders, and as a result of the movement of the liquid within the system between the bladders. The concepts of convergence and the introduction of nozzles is discussed in greater detail herein below, including experimental data showing the effects of nozzles on the system discussed herein.

In use, starting at zero tide level on a rising tide, the water level above the offshore bladder 104 is allowed to increase until the pressure differential is capable of generating optimal power from flow through the generator. At that time (expected to be less than about 1 hour from the zero-differential time), the shutoff valve disposed within the turbine housing 106 is automatically opened and head-driven flow will flow through the generator. These bladders are designed such that manifold/converging sections on each side of the generator that greatly increase the flow velocity as the generator is approached. This control system maintains flow rates in the optimal velocity range for a given hydropower turbine, enabling maximum energy extraction within the design constraint of the contained volumes—even in areas small tidal ranges.

When the offshore tide begins to fall, the pressure differential eventually drops below the optimal value for power generation; and the cutoff valve will again be closed, until the lowering water above the offshore bladder attains a potential pressure differential capable of producing the optimal negative flow for power generation in the offshore direction (again expected to be less than about a 1-hour duration). In this operation, semi-diurnal tides typical along the East Coast of the United States can generate dependable, optimal power for about 4 hours out of every ~6 hours of available time.

Figure 3:
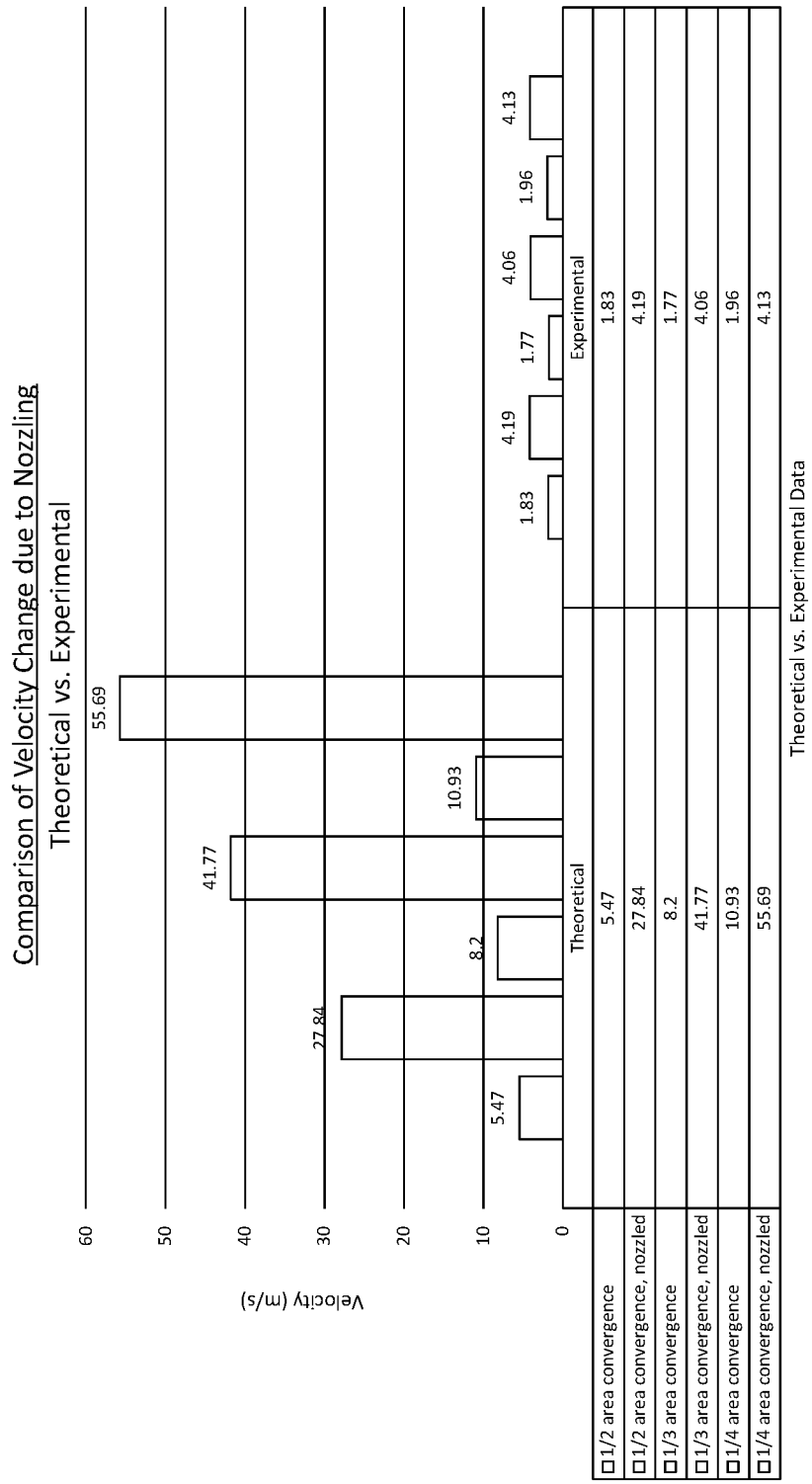
FIG. 3 is a table showing theoretical and experimental results of introducing a nozzle into a closed bladder system designed to capture tidal energy, according to an embodiment of the current invention.

Example 2 (See FIG. 3)

An example of the change in velocity caused by the valves used in combination with the bladders of the tidal system is now discussed herein. An experiment was performed to determine flow rates, or velocities, through pipes having varying structures, and the effects on the pipes of using a valve, or nozzle, the increase the flow rate. Theoretical results were calculated and were compared with experimental results obtain through testing. As shown in the table of FIG. 3, the theoretical results of the introduction of a nozzle to pipes having varying degrees of convergence yielded a 509% increase in velocity. Accordingly, it was theorized that the increased velocity through both a convergent structure in a pipe (as opposed to a straight pipe), as well as the introduction of valves, or nozzles, to the pipe, would result in an increase in the tidal energy extracted by the bladder system discussed above.

The experiment was designed to analyze the flow rates of a straight pipe with no convergence, as well as pipes having ½ area convergence, ⅓ area convergence, and ¼ area convergence. The differences in velocity resulting from the introduction of a nozzle into the pipes was also measured. As the table in FIG. 6 shows, introducing a nozzle into the pipes results in varying increases in flow rate, ranging from 211% to 230%. The difference between the measured increases and the predicted increases can be attributed to greater-than-expected frictional losses as a result of performing the experiment on a small scale.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall there between.

What is claimed is:

1. A system for optimal extraction of head-driven tidal energy with minimal negative environmental effects, the system comprising:
   a closed on-shore bladder located at a local mean sea level;
   a closed off-shore bladder in communication with the on-shore bladder;
   a liquid at least partially disposed within one of the on-shore bladder and the off-shore bladder, the liquid adapted to flow between the on-shore bladder and the off-shore bladder depending on a pressure differential between the bladders;
   a turbine housing disposed between the on-shore bladder and the off-shore bladder; and
   a hydropower turbine disposed within the turbine housing, wherein the turbine captures potential energy derived from head differentials over a tidal cycle between the on-shore bladder and the off-shore bladder;
   wherein head-driven tidal energy is captured when a water level above the off-shore bladder rises or falls, thereby altering the pressure differential between the bladders, and thereby altering a flow velocity of the liquid between the off-shore bladder and the on-shore bladder.

2. The system of claim 1, wherein the on-shore bladder is oversized, such that the on-shore bladder is adapted to contain a total volume of the liquid in the system.

3. The system of claim 2, wherein the oversized nature of the on-shore bladder allows the on-shore bladder to expand upward and contract downward depending on a water level above the off-shore bladder, thereby maximizing the pressure differential between the on-shore bladder and the off-shore bladder.

4. The system of claim 1, wherein the off-shore bladder is oversized, such that the off-shore bladder is adapted to contain a total volume of the liquid in the system.

5. The system of claim 4, wherein the oversized nature of the off-shore bladder allows the off-shore bladder to expand upward and contract downward depending on the water level above the off-shore bladder, thereby maximizing the pressure differential between the on-shore bladder and the off-shore bladder.

6. The system of claim 1, wherein each of the off-shore bladder and the on-shore bladder is made of a compliant material, such that each of the bladders allows the liquid to flow between the bladders with minimal lost energy due to friction, thereby maximizing the head-driven tidal energy extracted from the system.

7. The system of claim 1, further comprising:
a generator in communication with the hydropower turbine; and
a pressure-sensing shut-off valve in communication with the off-shore bladder, wherein the shut-off valve is opened when a pressure differential of a water level above the off-shore bladder is sufficient to generate optimal power from the flow of the liquid through the generator, wherein opening the shut-off valve permits head-driven flow of the liquid to flow through the generator.

8. The system of claim 7, wherein the shut-off valve is closed when the pressure differential above the off-shore bladder reduces to a value that is insufficient for optimal power generation.

9. The system of claim 8, wherein the shut-off valve remains closed until the lowering water above the off-shore bladder attains a potential pressure differential capable of producing optimal negative flow for power generation in the offshore direction.

10. The system of claim 7, wherein the off-shore and on-shore bladders include manifolds on each side of the generator to cause flow velocity to increase as the flow approaches the generator.

11. The system of claim 1, further comprising a control system that maintains the flow velocity in an optimal velocity range for the hydropower turbine, thus enabling maximum energy extraction.

12. A closed system for optimal extraction of head-driven tidal energy with minimal negative environmental effects, the system comprising:
an on-shore bladder located at a local mean sea level;
an off-shore bladder in communication with the on-shore bladder;
a liquid at least partially disposed within one of the on-shore bladder and the off-shore bladder, the liquid adapted to flow between the on-shore bladder and the off-shore bladder depending on a pressure differential between the bladders;
a hydropower turbine disposed between the on-shore bladder and the off-shore bladder, wherein the turbine captures potential energy derived from head differentials over a tidal cycle between the on-shore bladder and the off-shore bladder;
a generator in communication with the hydropower turbine; and
a pressure-sensing shut-off valve in communication with the off-shore bladder, wherein the shut-off valve is opened when a pressure differential of a water level above the off-shore bladder is sufficient to generate optimal power from the flow of the liquid through the generator, wherein opening the shut-off valve permits head-driven flow of the liquid to flow through the generator at a flow velocity.

13. The system of claim 12, wherein each of the on-shore bladder and the off-shore bladder is oversized, such that each of the bladders is adapted to contain a total volume of the liquid in the system at a given time.

14. The system of claim 13, wherein the oversized nature of each of the off-shore bladder and the on-shore bladder allows each bladder to expand upward and contract downward depending on the water level above the off-shore bladder, thereby maximizing the pressure differential between the on-shore bladder and the off-shore bladder.

15. The system of claim 12, wherein each of the off-shore bladder and the on-shore bladder is made of a compliant material, such that each of the bladders allows the liquid to flow between the bladders with minimal lost energy due to friction, thereby maximizing the head-driven tidal energy extracted from the system.

16. The system of claim 12, wherein the shut-off valve is closed when the pressure differential above the off-shore bladder reduces to a value that is insufficient for optimal power generation.

17. The system of claim 16, wherein the shut-off valve remains closed until the lowering water above the off-shore bladder attains a potential pressure differential capable of producing optimal negative flow for power generation in the offshore direction.

18. The system of claim 12, wherein the off-shore and on-shore bladders include manifolds on each side of the generator to cause flow velocity to increase as the flow approaches the generator.

19. The system of claim 18, further comprising a control system including the manifolds, the control system maintaining the flow velocity in an optimal velocity range for the hydropower turbine, thus enabling maximum energy extraction.

20. A closed tidal energy system, comprising:
an on-shore bladder located at a local mean sea level;
an off-shore bladder in communication with the on-shore bladder;
a liquid at least partially disposed within one of the on-shore bladder and the off-shore bladder, the liquid adapted to flow between the on-shore bladder and the off-shore bladder depending on a pressure differential between the bladders;
a turbine housing disposed between the on-shore bladder and the off-shore bladder;
a hydropower turbine disposed within the turbine housing, wherein the turbine captures potential energy derived from head differentials over a tidal cycle between the on-shore bladder and the off-shore bladder;
a generator in communication with the hydropower turbine;
a pressure-sensing shut-off valve in communication with the off-shore bladder, wherein the shut-off valve is opened when a pressure differential of a water level above the off-shore bladder is sufficient to generate optimal power from the flow through the generator, wherein opening the shut-off valve permits head-driven flow to flow through the generator,
wherein the off-shore and on-shore bladders include manifolds on each side of the generator to cause flow velocity to increase as the flow approaches the generator;
a control system, including the manifolds, that maintains the flow velocity in an optimal velocity range for the hydropower turbine, thus enabling maximum energy extraction,
wherein the shut-off valve is closed when the pressure differential above the off-shore bladder reduces to a value that is insufficient for optimal power generation,
wherein the shut-off valve remains closed until the lowering water above the off-shore bladder attains a potential pressure differential capable of producing optimal negative flow for power generation in the offshore direction.

\* \* \* \* \*